(12) United States Patent
Ahmed et al.

(10) Patent No.: US 10,554,577 B2
(45) Date of Patent: Feb. 4, 2020

(54) ADAPTIVE RESOURCE SCHEDULING FOR DATA STREAM PROCESSING

(71) Applicant: INTERNATIONAL BUSINESS MACHINES CORPORATION, Armonk, NY (US)

(72) Inventors: Khalid Ahmed, Markham (CA); Xiao Ming Bao, Beijing (CN); Kuan Feng, Shanghai (CN); Jun Feng Liu, Markham (CA)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 15/458,635

(22) Filed: Mar. 14, 2017

(65) Prior Publication Data

US 2018/0270164 A1 Sep. 20, 2018

(51) Int. Cl.
*G06F 15/16* (2006.01)
*H04L 12/927* (2013.01)
(Continued)

(52) U.S. Cl.
CPC .............. *H04L 47/801* (2013.01); *G06F 9/38* (2013.01); *G06F 9/50* (2013.01); *G06F 9/5022* (2013.01); *G06F 16/24568* (2019.01); *H04L 47/822* (2013.01); *H04L 47/823* (2013.01); *H04L 67/325* (2013.01)

(58) Field of Classification Search
CPC . G06F 9/38; G06F 9/3842; G06F 9/48; G06F 9/4806; G06F 9/4843; G06F 9/50; G06F 9/5011–038; G06F 9/505; G06F 9/5061; G06F 9/5066; G06F 16/24568;
(Continued)

(56) References Cited

U.S. PATENT DOCUMENTS 6,560,627 B1 *  5/2003  McDonald ................ G06F 9/52
                                                        718/100
7,028,299 B1 *  4/2006  Chang ................... G06F 9/4881
                                                        707/999.008
(Continued)

FOREIGN PATENT DOCUMENTS

CN         103150148 B      6/2016

OTHER PUBLICATIONS

Hagedorn et al., "Stream processing platforms for analyzing big dynamic data", it—Information Technology 2016; Received Jan. 8, 2016; accepted May 9, 2016.

*Primary Examiner* — Brendan Y Higa
(74) *Attorney, Agent, or Firm* — Brian F. Russell; Robert Sullivan

(57) ABSTRACT

In at least one embodiment of stream processing in a data processing system cluster, a driver requests, from a cluster manager, execution of a first task within a job including a plurality of tasks, as well as a first quantity of resources of the cluster to support execution of the task. At completion of execution of the first task by the cluster, the driver retains for a second task among the plurality of tasks at least a portion of the resources allocated to the first task by the cluster manager. The driver determines a second quantity of the resources to retain for the second task based on a relative priority of the job to other jobs in the cluster and efficiency of the cluster manager in allocating resources to the first task.

18 Claims, 7 Drawing Sheets

(51) Int. Cl.
  *H04L 29/08* (2006.01)
  *H04L 12/911* (2013.01)
  *G06F 16/2455* (2019.01)
  *G06F 9/38* (2018.01)
  *G06F 9/50* (2006.01)
(58) Field of Classification Search
  CPC ....... H04L 47/70–76; H04L 47/82–823; H04L 47/827
  See application file for complete search history.

(56) References Cited

U.S. PATENT DOCUMENTS

| | | | |
|---|---|---|---|
| 7,137,119 B1* | 11/2006 | Sankaranarayan | G06F 9/5011 718/103 |
| 7,596,788 B1* | 9/2009 | Shpigelman | G06F 9/4881 718/100 |
| 9,009,322 B1 | 4/2015 | Molleti et al. | |
| 2009/0113442 A1* | 4/2009 | Deidda | G06F 9/5044 718/105 |
| 2009/0199192 A1* | 8/2009 | Laithwaite | G06Q 10/109 718/104 |
| 2012/0198462 A1* | 8/2012 | Cham | G06F 9/5038 718/103 |
| 2014/0149986 A1* | 5/2014 | S M | G06F 9/5083 718/1 |
| 2014/0173623 A1* | 6/2014 | Chang | G06F 9/5088 718/105 |
| 2014/0359632 A1* | 12/2014 | Kishan | G06F 9/5038 718/103 |
| 2016/0094479 A1 | 3/2016 | Dwarkha et al. | |
| 2016/0098662 A1 | 4/2016 | Voss et al. | |
| 2016/0269315 A1 | 9/2016 | Eriksson et al. | |
| 2018/0081720 A1* | 3/2018 | Zlatanchev | G06F 9/4887 |

\* cited by examiner

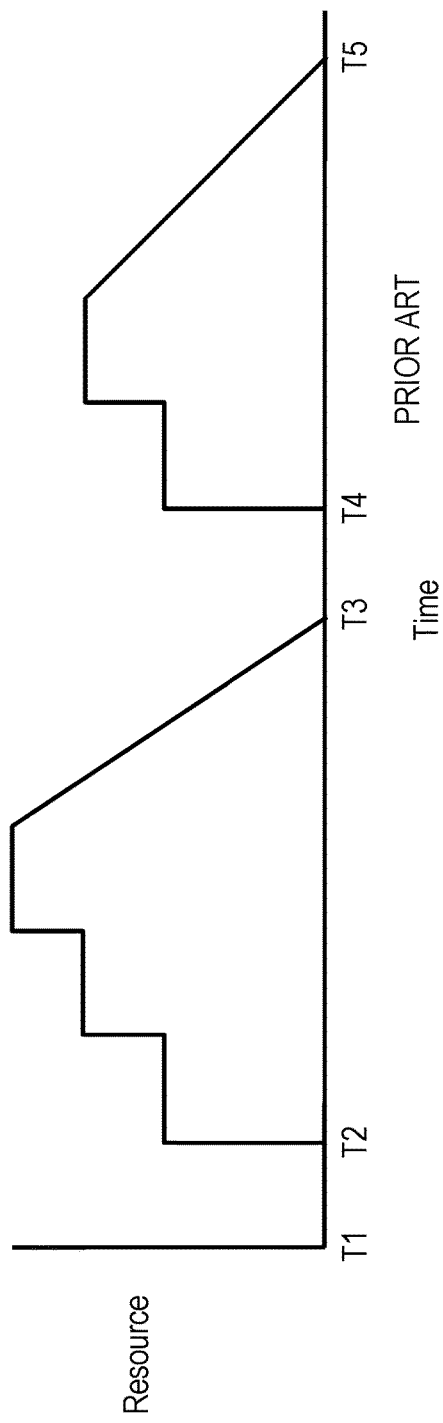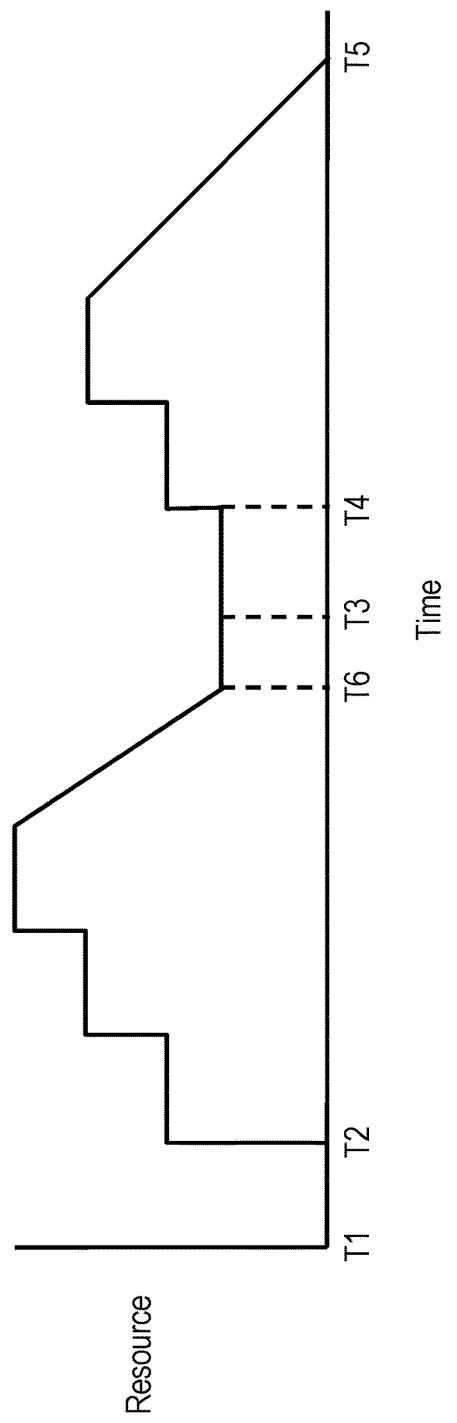

ADAPTIVE RESOURCE SCHEDULING FOR DATA STREAM PROCESSING

BACKGROUND OF THE INVENTION

This disclosure relates to a data processing and, in particular, to adaptive resource scheduling for data stream processing.

Stream processing systems are computing systems designed to support ingestion and processing of continuous streams of data. One well known stream processing system is Spark™ (SPARK is a trademark of the Apache Software Foundation), which is an open source cluster computing framework.

Spark Core is the principal component of SPARK and provides distributed task dispatching, scheduling, and input/output (I/O) functionalities. These functions are accessed through an application programming interface (API) that employs a Resilient Distributed Dataset (RDD) abstraction of a fault-tolerant dataset. The API serves as a "driver" that invokes parallel operations on an RDD by passing a function to Spark Core, which then schedules the function's execution in parallel on the cluster.

Spark Streaming is an additional SPARK component that utilizes the scheduling provided by Spark Core to repetitively perform streaming analytics on a continuous data stream. Spark Streaming receives a DStream (discretized stream), which is a sequence of micro-batches of RDD data (of any of a variety of supported formats), and performs desired RDD transformation(s) on the DStream.

Because SPARK tasks are assigned dynamically within a cluster based, for example, on data locality of the data and the availability of computational and storage resources, SPARK can provide significant benefits, such as improved load balancing and fault recovery. As appreciated by the present disclosure, discretizing the data records of the input data stream into micro-batches of data also presents a significant challenge with regard to resource allocation and utilization.

BRIEF SUMMARY

In at least one embodiment of stream processing in a data processing system cluster, a driver requests, from a cluster manager, execution of a first task within a job including a plurality of tasks, as well as a first quantity of resources of the cluster to support execution of the task. At completion of execution of the first task by the cluster, the driver retains for a second task among the plurality of tasks at least a portion of the resources allocated to the first task by the cluster manager. The driver determines a second quantity of the resources to retain for the second task based on a relative priority of the job to other jobs in the cluster and efficiency of the cluster manager in allocating resources to the first task.

BRIEF DESCRIPTION OF THE SEVERAL VIEWS OF THE DRAWINGS

FIGS. 8A-8B are timing diagrams illustrating smart resource caching between stages of a job in a data processing system cluster in accordance with the present disclosure.

DETAILED DESCRIPTION

Figure 1:
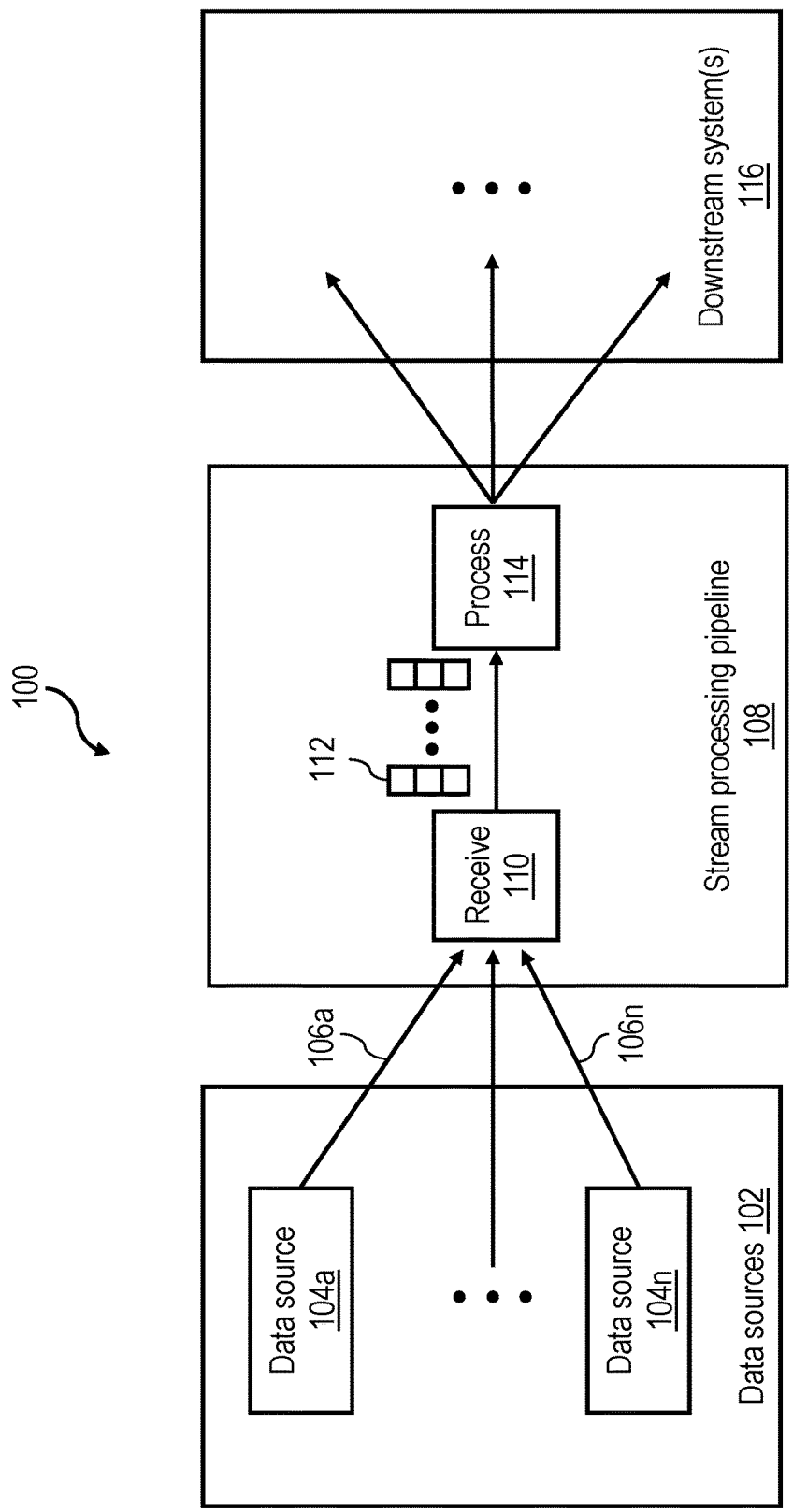
FIG. 1 is a high level block diagram of a stream processing architecture in accordance with one embodiment.

With reference now to the figures and with particular reference to FIG. 1, there is illustrated a high level logical flowchart of an exemplary stream processing environment 100 in accordance with one embodiment. Stream processing environment 100 includes a collection of data sources 102 including a plurality of possibly distributed data sources 104a-104n each providing a respective input data stream (i.e., sequence) 106a-106n of data records. Data sources 104a-104n may be, for example, Internet of Things (IOT) devices, live logs, telemetry devices, etc.

Data streams 106a-106n are ingested by a receive stage 110 of a stream processing pipeline 108. In at least one embodiment, at receive stage 110, the data records of data streams 106a-106n are discretized into a sequence of micro-batches 112 (e.g., of RDD data) and forwarded to a process stage 114 of stream processing pipeline 108. At process stage 114, one or more desired transformations are applied to micro-batches 112 to obtain output data (results). Process stage 114 can forward the output data to one or more downstream systems 116 for further processing and/or storage (e.g., in a database).

Figure 2:
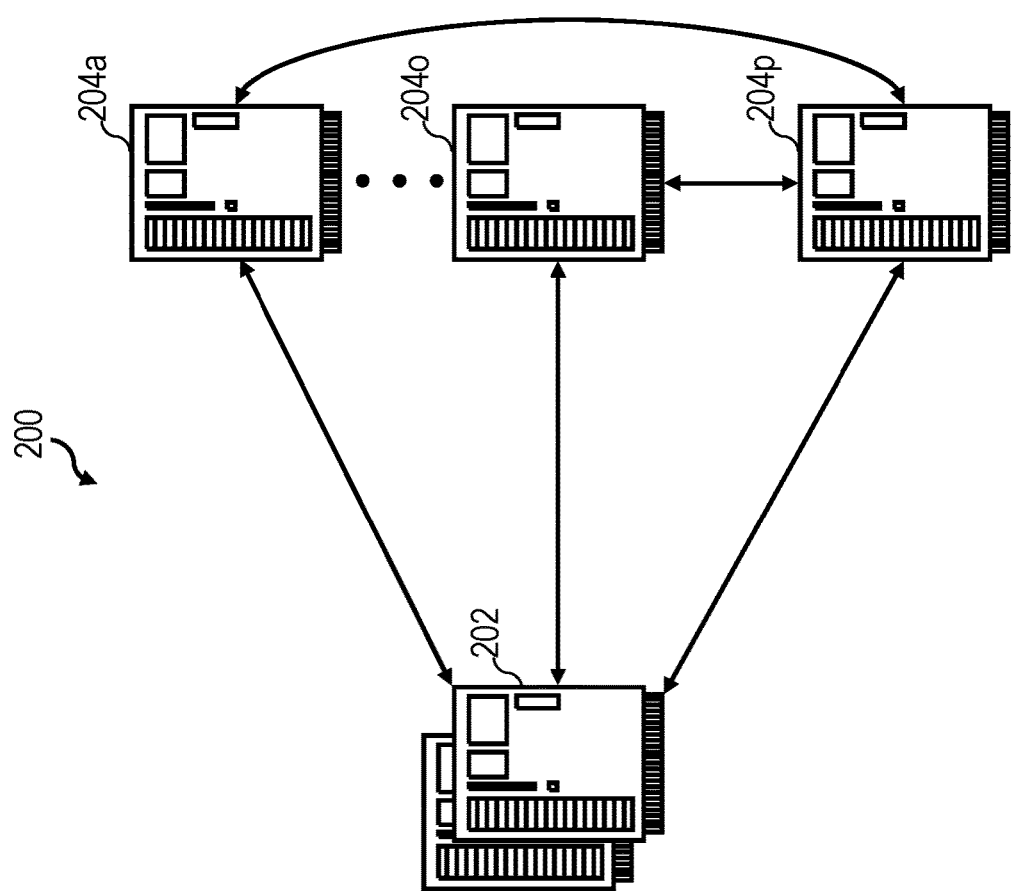
FIG. 2 depicts a data processing system cluster in accordance with one embodiment.

Referring now to FIG. 2, there is depicted a data processing system cluster 200 on which a stream processing pipeline 108 may be implemented in accordance with one embodiment. As shown, data processing system cluster 200 includes one or more cluster management systems 202 and a plurality of worker systems 240a-204p coupled for communication by one or more communication links. Cluster management system(s) 202 control membership in and operation of the data processing system cluster 200 and schedule tasks to be performed by worker systems 240a-240p. Worker systems 240a-240p execute the tasks assigned by management node(s) 202 and then store and/or forward the computational results.

Figure 3:
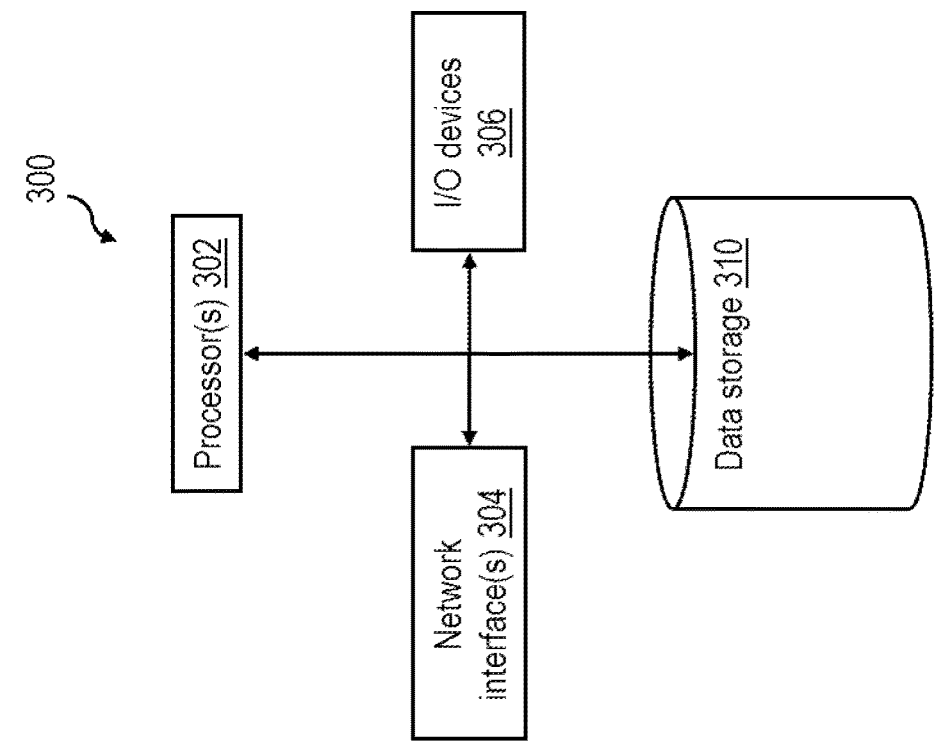
FIG. 3 illustrates a high level block diagram of an exemplary data processing system that can be utilized to implement any of the management system(s) or worker systems of FIG. 2.

With reference now to FIG. 3, there is illustrated a high level block diagram of an exemplary data processing system 300, such as a server computer system, that can be utilized to implement any of cluster management systems(s) 202 or worker systems 204a-204p of FIG. 2. In the illustrated exemplary embodiment, data processing system 300 includes one or more network interfaces 304 that permit data processing system 300 to communicate with data sources 102 and one or more other member systems of data processing system cluster 200 via cabling and/or one or more wired or wireless, public or private, local or wide area networks (including the Internet). Data processing system 300 additionally includes one or more processors 302 that process data and program code, for example, to ingest, manage, access, manipulate, output and/or store data or software in stream processing environment 100. Data processing system 300 also includes input/output (I/O) devices 306, such as ports, displays, and attached devices, etc., which receive inputs and provide outputs of the processing performed by data processing system 300 and/or other resource(s) in stream processing environment 100. Finally, data processing system 300 includes data storage 310, which may include one or more volatile or non-volatile storage devices, including cache memories, system memories, solid state drives, optical or magnetic disk drives, etc. Data storage 310 may store, for example, software for performing stream processing, input data to be processed and/or data results of stream processing.

Figure 4:
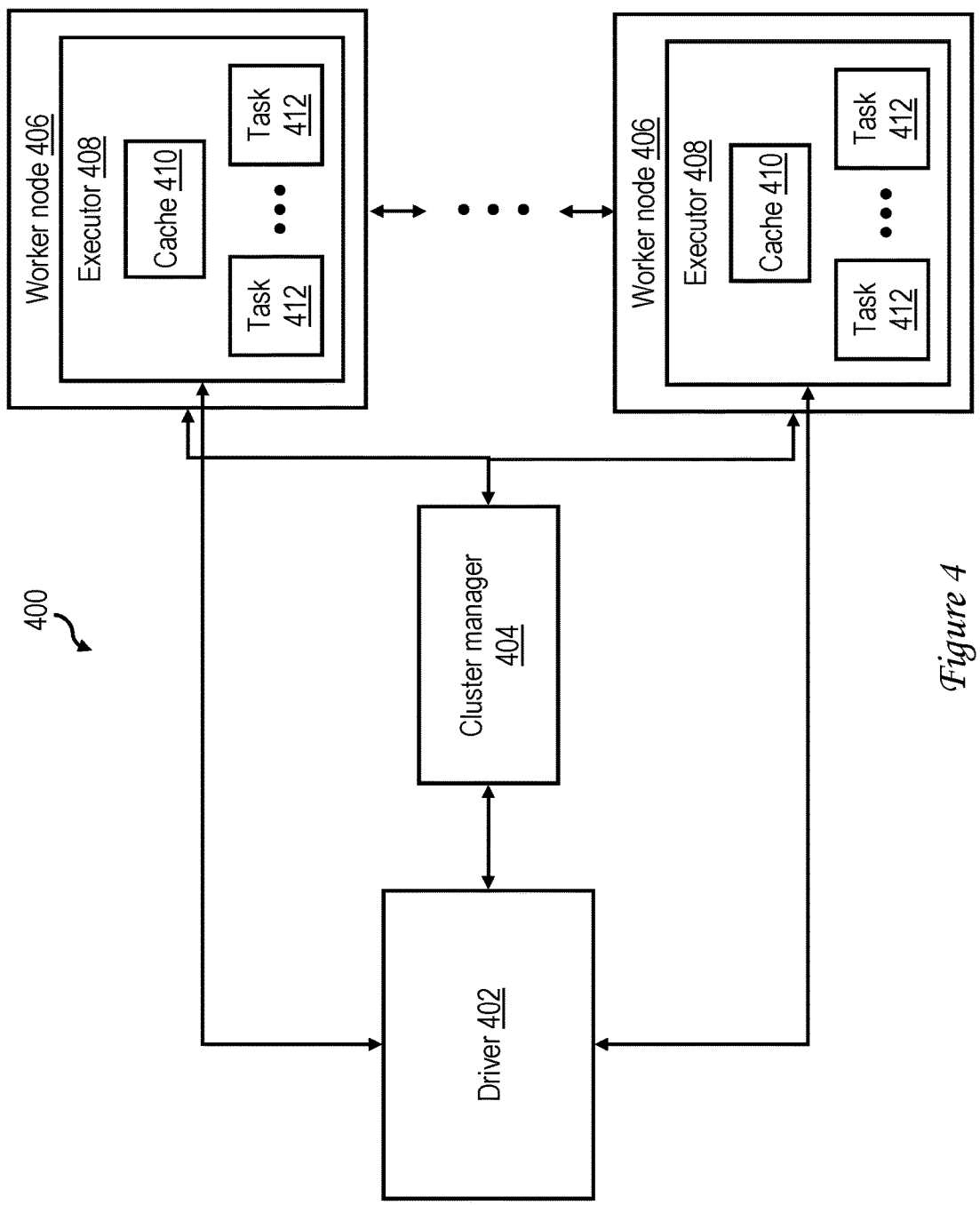
FIG. 4 depicts an exemplary software configuration suitable for configuring the data processing system cluster of FIG. 2 for stream processing.

Referring now to FIG. 4, there is depicted an exemplary software configuration 400 suitable for configuring data processing system cluster 200 of FIG. 2 for stream processing. Exemplary software configuration 400 includes at least one driver 402 and a cluster manager 404, both of which execute on cluster management system(s) 202.

Figure 5:
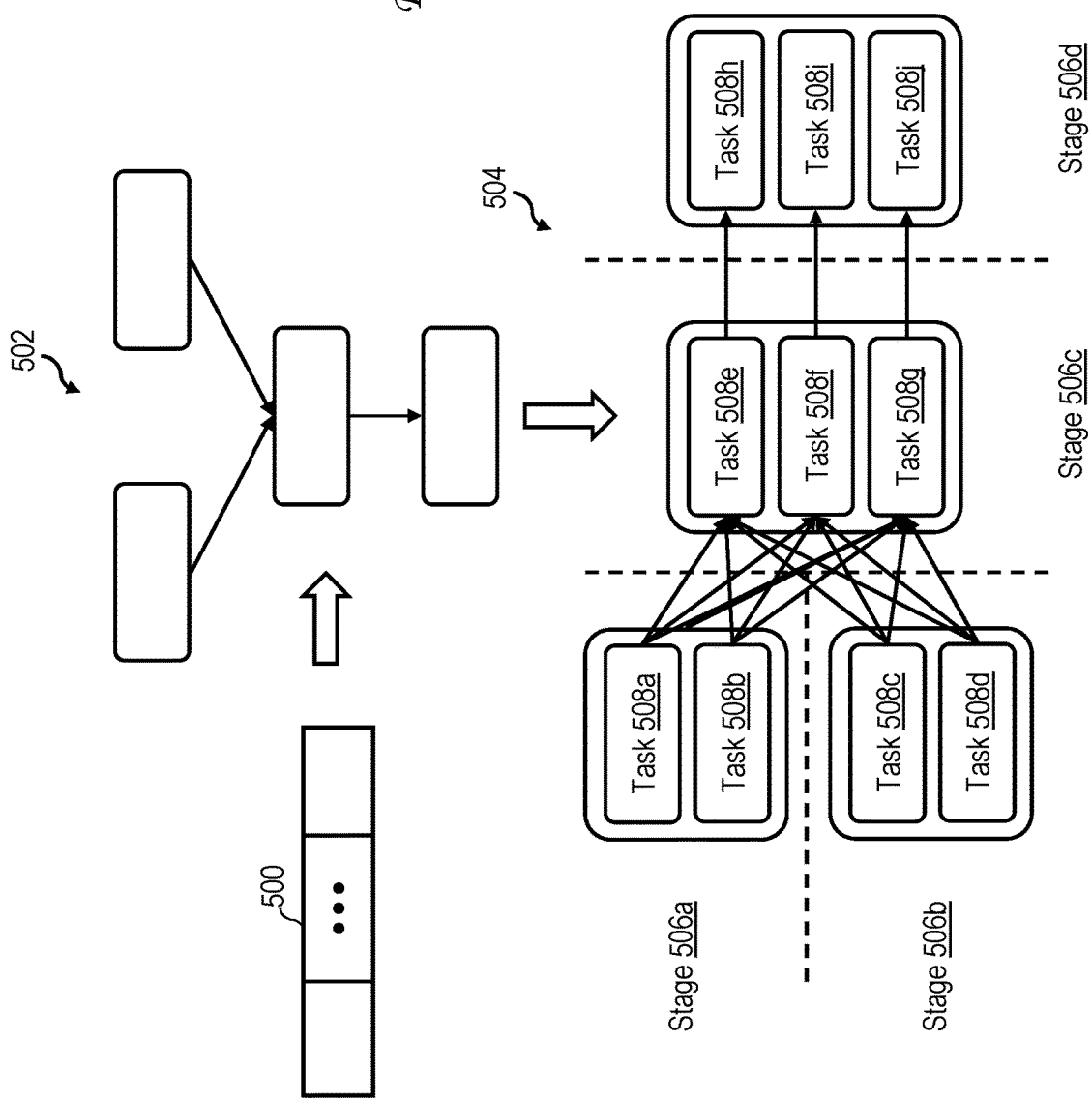
FIG. 5 illustrates processing of a driver of stream processing system in accordance with one embodiment.

Driver 402, which in some embodiments can be implemented by the API exposed by the Spark Core, receives a stream of data records, which is shown generally at reference numeral 500 of FIG. 5. Driver 402 discretizes the stream of data records 500 to create a RDD abstraction of the dataset, which takes the form of a directed acyclic graph (DAG), as shown at reference number 502 of FIG. 5. As generally illustrated at reference number 504 of FIG. 5, driver 402 also includes a DAG-based scheduler that, based on DAG 502, divides the processing of the RDD data set into a job comprising a sequence of stages 506, each including one or more tasks 508. In the example given in FIG. 5, the DAG-based scheduler of driver 402 produces a job 504 including stages 506a-506d, where stage 506a includes tasks 508a-508b, stage 506b includes tasks 508c-508d, stage 506c includes tasks 508e-508g, and stage 506d includes tasks 508h-508j. Driver 402 passes the task set of the job to cluster manager 404 in a request for resources to execute the tasks within the task set.

In response to receiving the request for resources to execute the tasks within the task set, cluster manager 404 allocates the resources of various worker nodes 406 deployed on one or more of worker systems 204a-204p of FIG. 2. As shown in FIG. 4, each of worker nodes 406 includes at least one executor 408 having multiple threads of execution for executing one or more tasks 412 in the task set of a job by reference to an in-memory cache 410 for storing input data and computational results. Each unit of resource (e.g., memory, CPU utilization, and/or disk storage) independently allocable as a resource for storing an execution result is referred to herein as a "slot."

In prior art stream processing systems, the driver has conventionally requested resources from the cluster manager based on the number of pending tasks and has ignored the resource request round trip time between when the resource is requested by the driver and when the requested resource is released for re-use by an executor. The present disclosure appreciates, however, that in the context of stream processing of micro-batches of data provided in RDD datasets, the duration of task execution is typically much shorter than the resource request round trip time between the request and allocation of a given resource. As a result, the overhead of requesting resources from the cluster manager is not ignorable, especially when the cluster manager is busy. For example, the resource request round trip time may be on the order of 2 seconds, while the duration of task execution may be on the order of 10 milliseconds.

Under this so-called "tiny task" processing scenario, resource utilization may become inefficient. For example, a cluster manager may waste time in re-allocating slots between stages of a job. In addition, the driver may over-request slots at the beginning of stage of a job to avoid the latency involved in dynamically acquiring additional slots and thus be able to reuse existing slots to avoid waiting for additional resources to be allocated for subsequent stages of job execution. Further, the inefficiency in resource utilization may lead to over-caching of resources at the conclusion of each task. Moreover, the inefficiency in resource utilization may lead to a conflict between job interest and cluster utilization in which a greedy job retains all its slots, and the cluster manager has no way to compare the actual usage of resources to the quantum of resources it allocated to the job.

According to the present disclosure, the efficiency of resource utilization in a stream processing environment is improved by the driver (e.g., driver 402 of FIG. 4) leveraging DAG information and execution history to improve the amount of resources requested from cluster manager 404 for a stage of a job and the amount of resources cached at the conclusion of the stage. As discussed further herein, to support this improved resource utilization, the driver preferably calculates and employs a plurality of timing and priority metrics, including an Applied Allocation Time (AAT) across multiple jobs in the data processing system cluster, a Current Allocation Time (CAT) for the current job, an Applied Job Priority (AJP) for the current job versus other job(s) in the cluster, an Applied Task Time (ATT) of each stage in the current job, and a Resource Reuse Time (RRT) for the resources allocated to the current job. The implementation of these optimizations at the driver (rather than in the user job or in the cluster manager) allows resource utilization to be improved without any modification to the user job or to the cluster manager (which can implemented with any of a number of available cluster managers and can be entirely conventional). Further, over-caching resources (caching resources for too long and/or caching too many resources) and over-requesting resources can be reduced and/or eliminated with very light overhead introduced on top of the conventional processing of driver 402.

Figure 6:
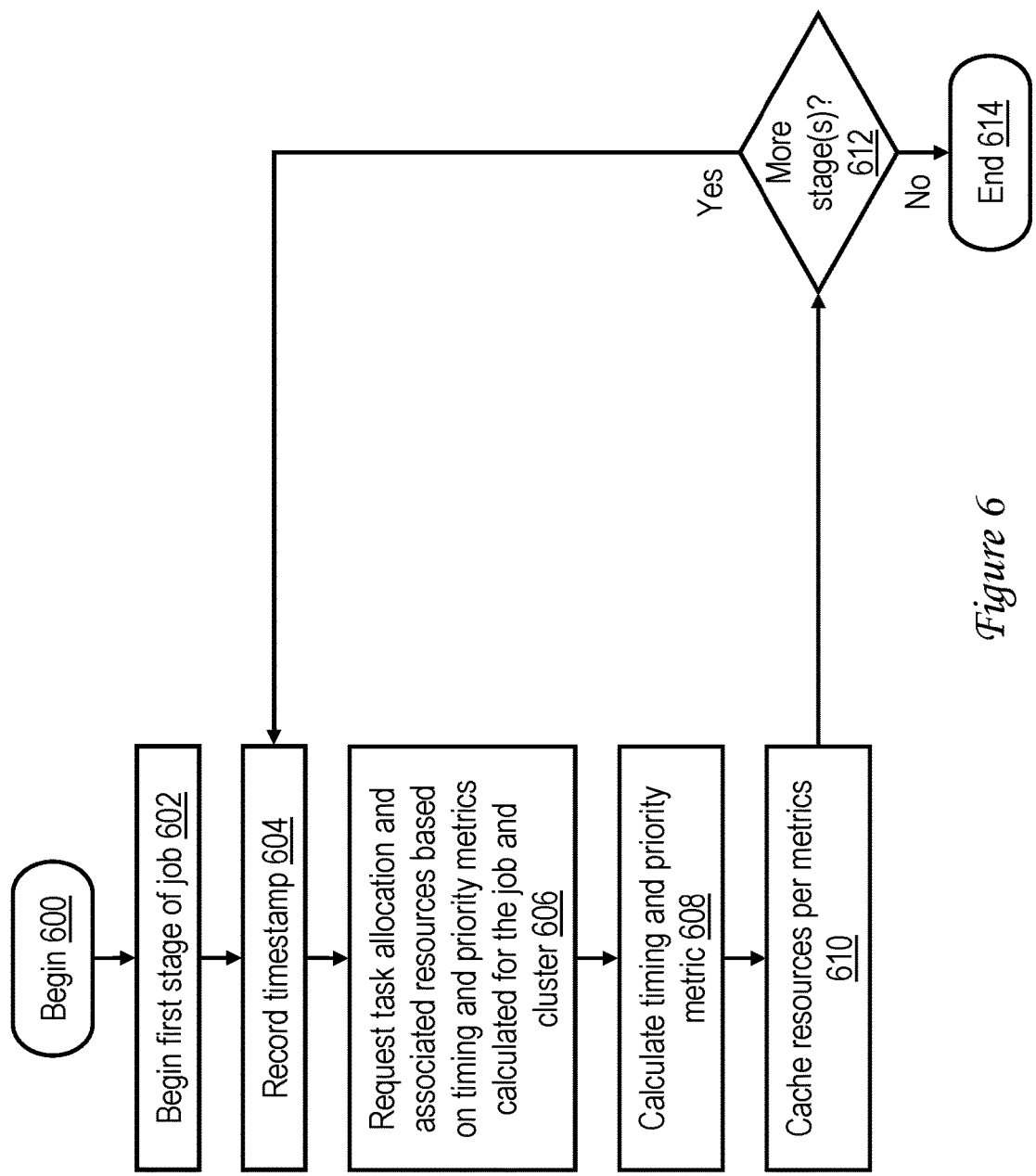
FIG. 6 depicts a high level logical flowchart of an exemplary method by which a driver of stream processing environment requests resources based on timing and priority metrics.

Referring now to FIG. 6, there is depicted a high level logical flowchart of an exemplary method by which a driver of a stream processing environment requests and caches resources based on timing and priority metrics in accordance with one embodiment. For ease of understanding, the method of FIG. 6 is described below with reference to the exemplary software architecture given in FIG. 4 and the exemplary process flow diagram given in FIG. 5. It should be appreciated that in at least some embodiments multiple instances of the illustrated process may be performed concurrently.

The process of FIG. 6 begins at block 600 and then proceeds to block 602, which illustrates driver 402 beginning processing of a first stage of a stream processing job. As processing of the first stage of the job begins, driver 402 records a timestamp as a baseline value from which to compute various timing metrics, as discussed further below (block 604). Next, at block 606, driver 402 requests from cluster manager 404 processing of the tasks comprising the current stage and requests allocation of resources to support the execution of the tasks. The quantity of requested resources is preferably based on the resources required for processing the tasks in the stage (i.e., demanded resources), previously allocated resource that are cached (if any), as well as Applied Allocation Time (AAT) and Applied Task Time (ATT). For example, in one preferred embodiment, the quantity of resource (i.e., slots) requested for the current stage is given by:

$$\text{Resource}_{Requested} = \text{Resource}_{Demanded} - (\text{AAT}/\text{ATT} \times \text{Resource}_{cached})$$

This relation, which reflects the reality in a typical tiny task environment that the processing of one or more tasks will complete prior to the resource request being granted (i.e., the request round trip time is much greater than the task processing time), saves the time associated with reallocating resources and avoids over-requesting of resources at the start of a stage of a job.

In response to grant of the allocation request, driver 402 determines at block 608 one or more timing and priority metrics that can be utilized to appropriately size the resource allocation request for the next stage of the job (or the first stage of the next job) and to determine the resources to retain (i.e., cache) at the end of the current stage. In a preferred embodiment, these timing metrics include the Current Allocation Time (CAT) and Applied Allocation Time (AAT). In a preferred embodiment, the CAT is the most recently computed time period between driver 402 sending a request for resources to the cluster manager 404 and receipt by driver 402 of a message from cluster manger 404 confirming allocation of the requested resources. The Applied Allocation Time (AAT) can then be computed based on a weighting of the CAT with the round trip times of N previous resource requests, where N is an integer greater than 1 (and in some embodiments, includes all previous resource requests). In one example, AAT is given by:

$$AAT_{new} = AAT_{old} \times Weight_{AAT} + CAT \times (1 - Weight_{AAT})$$

where $Weight_{AAT}$ is a tunable parameter that varies the influence of previously observed allocation times. For example, if $Weight_{AAT}$ is set to 0, then $AAT_{new}$ is simply equal to the CAT; if, on the other hand, $Weight_{AAT}$ is set to 0.5, $AAT_{new}$ will depend equally on the CAT and $AAT_{old}$.

At block 608, driver 402 also calculates one or more priority metrics associated with the job, including an Applied Job Priority (AJP) that describes the priority of the current job relative to the priority of other jobs being executed within the cluster at runtime. The AJP can be utilized by driver 402 to determine how many (if any) resources (slots) should be retained for the job at the end of each stage. As one example, if a job is received with a low demanded priority (e.g., as specified for the job with a user-level parameter) but the cluster is relatively free, it is desirable if the AJP is relatively high, so that the job will carry its allocated resources to next stage. Conversely, if a job is submitted with high demanded priority, but a number of other high priority jobs are executing in an overloaded cluster, the AJP is preferably relatively low, so that resources can be shared with other jobs to improve cluster utilization.

In one preferred embodiment, the AJP is based on the historical efficiency of the cluster manager 404 in fulfilling prior resource requests. The ability of cluster manager 404 to appropriately allocate more resources to jobs with high AJPs may be bounded by system settings that limit the resources that may be allocated to a job in each stage and the number of resources reclaimed from the job during each stage. As one example, AJP can be given by:

$$AJP = Resource_{Allocated}/(Resource_{Requested} * Rounds) \times Sys\_Factor$$

where $Resource_{Requested}$ is the amount of resource requested from cluster manager 404 in the resource request made at block 606, $Resource_{Allocated}$ is the amount of resource allocated by cluster manager 404 in response to the resource request made at block 606, Rounds is the number of rounds of resource requests in the job, and Sys_Factor is a scaling factor reflecting a system limit to the resources that may be allocated to a job in each stage and the number of resources reclaimed from the job during each stage. In the event that a stage does not include an resource allocation request, the driver 402 may simply use the value of the immediately previous resource request. In this exemplary equation, AJP is conveniently scaled to a range of 0 to 1, with 0 representing the lowest priority and 1 the highest priority. Thus, if a job is allocated all requested resources or the amount of requested resources equals the system-imposed limit in the first round, AJP will equal 1, indicating the cluster is relatively free. As another example, if a job is allocated all requested resources after 10 rounds of requests, AJP is equal to 1/10. In yet another example, if a job receives only 50% of the requested resources after 10 rounds and is then finished with the allocated resources, AJP will equal 1/20.

At block 608, driver 402 may also calculate the Applied Task Time (ATT), which describes the actual task execution time observed in the cluster and excludes the resource allocation time. In one preferred embodiment, the ATT can computed as a weighted average of task execution times as follows:

$$ATT_{new} = ATT_{old} \times Weight_{ATT} + (Resource_{Allocated} \times Period)/Tasks \times (1 - Weight_{ATT})$$

where Tasks is the total number of tasks in the current stage of the job, $Resource_{Allocated}$ is the amount of resource allocated to the tasks, Period is the duration for which the resources are allocated, and $Weight_{ATT}$ is a weight between 0 and 1 that selects the desired impact of previous stages on ATT. For example, if $Weight_{ATT}$ is set to 0, then $ATT_{new}$ is simply equal to a Current Task Time (CTT); if, on the other hand, $Weight_{ATT}$ is set to 0.5, $ATT_{new}$ will depend equally on CTT and $ATT_{old}$.

Figure 7:
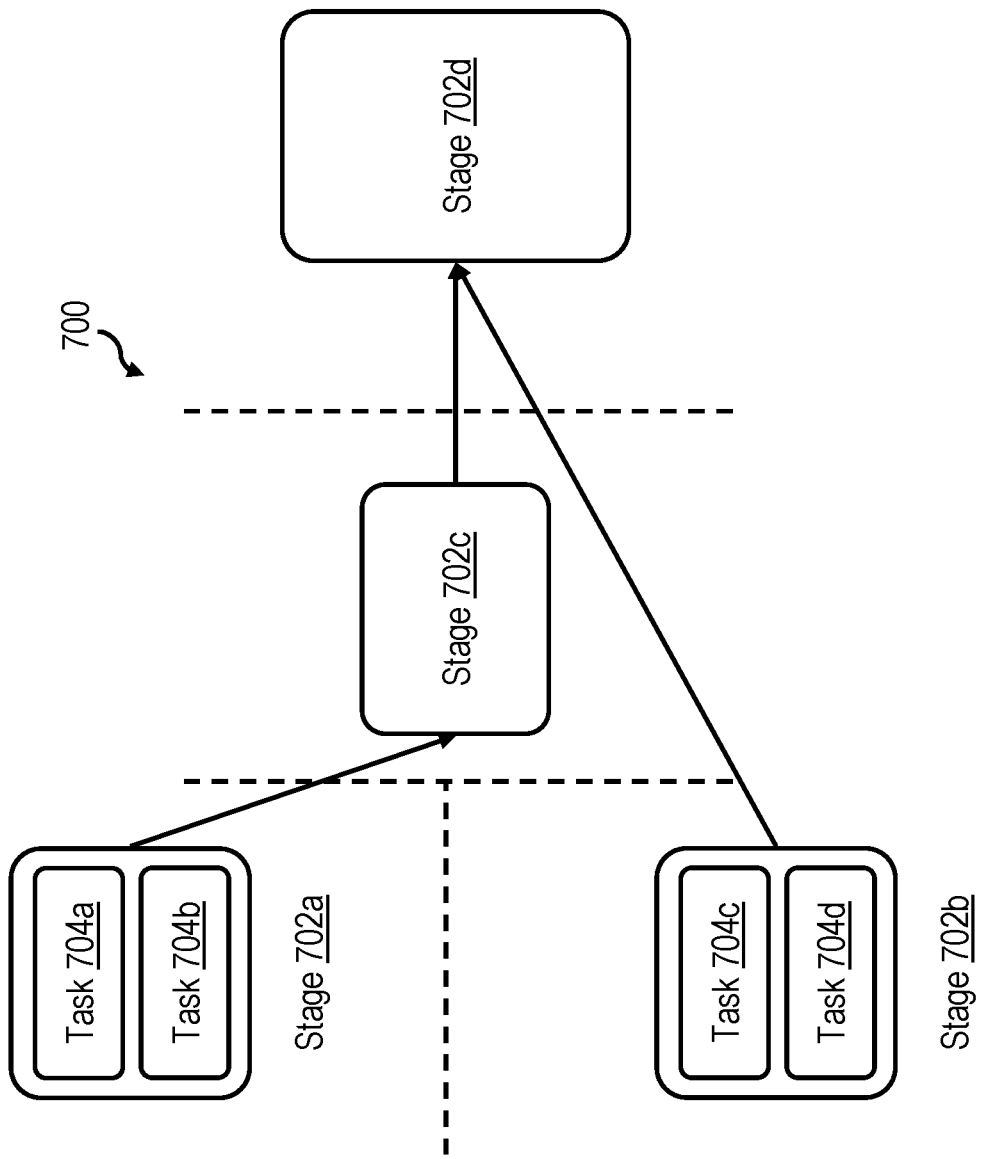
FIG. 7 is a graph of exemplary job having dependencies between its constituent tasks.

At block 608, driver 402 may also calculate the Resource Reuse Time (RRT), which describes the cost to the data processing system cluster 200 when driver 402 keeps a resource unused until the next stage. In order to determine the RRT, driver 402 determines the next stage of the current job from the DAG of the current job, as well as all stages having a dependency on the next stage. Driver 402 then utilizes the ending time of the latest finishing stage having a dependency on the current stage as the starting time of next stage and thus the ending of the RRT for the current stage. In the event that the latest finishing stage has not started by the time the current task finishes (or is otherwise difficult to estimate), then a large number can be utilized as an estimate of the RRT. For example, with additional reference to FIG. 7, assuming all stages 702 of job 700 require a same duration to finish, the RRT of tasks 704a-704b in stage 702a is to the end of stage 702a, the RRT of the unillustrated tasks in stage 702c is to the end of stage 702c, the RRT of the unillustrated tasks in stage 702d is to the end of stage 702d, and the RRT of tasks 704c-704d in stage 702b is to the end of stage 702c. If stage 702c has not started by the time the tasks 704c-704d of stage 702b finish, a large number can be utilized as an estimate of the RRT of tasks 704c-704d of stage 702b.

Returning to FIG. 6, the process proceeds from block 608 to block 610, which illustrates driver 402 caching resources at the conclusion of the current stage of the job in accordance with the various metrics calculated at block 608. That is, at block 608, driver 402 determines whether to cache resources at the conclusion of the current stage, and if so, how many resources to cache. In a preferred embodiment, if the data processing system cluster is lightly loaded (e.g., AJP 1), then there is no need to improve resource utilization, and driver 402 will cache the presently allocated resources at the end of the current stage of the current job. However, if AJP<1, driver 402 preferably frees some allocated resources to improve cluster utilization, unless RRT is less than or equal to AAT.

In one preferred embodiment, if driver 402 determines to cache less than all presently allocated resources, driver 402 can determine the amount of resources of cache by the following relation:

$$Resource_{Cached} = Resource_{eff} \times (AJP_{new})/(APJ_{old} \times (Resource_{Requested})/(Resource_{Requested\_prev})$$

where $Resource_{eff}$ is the number of cached and allocated resources available in the current stage and $Resource_{Requested\_prev}$ is the amount of resources requested in the previous stage. By intelligently determining whether to cache resources and, if so, how many resources to cache, driver 402 saves the time associated with needless reallocation of resources and reduces or eliminates caching too many resources or caching resources for too long a time.

Following block 610, the process of FIG. 6 passes to block 612, which illustrates driver 402 determining whether or not the current job includes additional stage(s). If not, the process ends at block 614. If, however, driver 402 determines that the current job includes at least one additional stage, the process of FIG. 6 returns from block 612 to block 604, which has been described.

Referring now to FIGS. 8A-8B, timing diagrams are given illustrating resource requesting and resource caching for a stream processing job in a data processing system cluster. In both diagrams, time is plotted along the X axis, and resources utilized for the job are plotted along the Y axis.

In FIG. 8A, which represents resource utilization in a prior art stream processing system, the driver requests resources for a first task of the job at time T1. In response to the resource request, the system manager begins to allocate resources to the first task at time T2. Resource utilization by the first task of the job steps up and down until the conclusion of the task at time T3. At time T3, all resources allocated to the first task are released, and the driver requests resources for execution of the second task of the job. In response to this second resource request, the system manager begins to allocate resources to the second task at time T4. Resource utilization by the second task of the job steps up and down until the conclusion of the task at time T5, at which point all resources allocated to the second task are released.

Referring now to FIG. 8B, intelligent resource requesting and caching in accordance with the teachings of the present disclosure are illustrated. In FIG. 8B, driver 402 requests resources for the first task of the job at time T1. In response to the resource request, system manager 404 begins to allocate resources to the first task at time T2. Resource utilization by the first task of the job steps up and down until time T6, at which point driver 402 begins to cache resources in excess of those needed to complete processing of the first task as discussed above with reference to block 610 of FIG. 6. At time T3, driver 402 requests additional resources in excess of the cached resources for execution of the second task of the job. In response to this second resource request, the system manager begins to allocate the additional requested resources to the second task at time T4. However, because the cached resources are immediately available, an executor 408 can begin execution of the second task at time T3 utilizing the cached resources. Execution of the second task of the job continues until the conclusion of the task at time T5, at which point the driver 402 may release all resources allocated to the second task.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment of stream processing in a data processing system cluster, a driver requests, from a cluster manager, execution of a first task within a job including a plurality of tasks, as well as a first quantity of resources of the cluster to support execution of the task. At completion of execution of the first task by the cluster, the driver retains for a second task among the plurality of tasks at least a portion of the resources allocated to the first task by the cluster manager. The driver determines a second quantity of the resources to retain for the second task based on a relative priority of the job to other jobs in the cluster and efficiency of the cluster manager in allocating resources to the first task.

While the present invention has been particularly shown as described with reference to one or more preferred embodiments, it will be understood by those skilled in the art that various changes in form and detail may be made therein without departing from the spirit and scope of the invention. For example, it should be understood that present invention may be implemented as a program product including a storage device storing program code that can be processed by a processor to perform the described functions or cause such functions to be performed. As employed herein, a "storage device" is specifically defined to include only statutory articles of manufacture and to exclude energy per se, transmission media per se, and transitory propagating signals per se.

In addition, although embodiments have been described that include use of a NAND flash memory, it should be appreciated that embodiments of the present invention can also be used with other types of non-volatile random access memory (NVRAM) including, for example, phase-change memory (PCM) or magnetoresistive random access memory (MRAM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of stream processing in a data processing system cluster, the method comprising:
   a processor executing a driver to request, from a cluster manager, (1) execution of a first task within a job including a plurality of tasks and (2) a first quantity of resources of the cluster to support execution of the task; and
   at completion of execution of the first task by the cluster, the processor executing the driver to retain for a second task among the plurality of tasks at least a portion of the resources allocated to the first task by the cluster manager, wherein the retaining includes:
    determining a second quantity of the resources to retain for the second task based on a relative priority of the job to other jobs in the cluster and efficiency of the cluster manager in allocating resources to the first task.

2. The method of claim 1, wherein the processor executing the driver to retain for the second task at least a portion of the resources allocated to the first task includes determining to retain the at least a portion of the resources allocated to the first task by the cluster manager only in response to determining a resource allocation time is less than a resource reuse time.

3. The method of claim 1, wherein the processor executing the driver to request, from the cluster manager, execution of the first task and the first quantity of resources includes determining the first quantity of resources based on a resource allocation time and a task execution time.

4. The method of claim 3, wherein the first quantity of resources is further based on a third quantity of resources retained following execution of a third task among the plurality of tasks that precedes the first task.

5. The method of claim 3, wherein the resource allocation time is a weighted resource allocation time derived across multiple tasks.

6. The method of claim 1, and further comprising the processor executing the driver to request, from the cluster manager, execution of the second task within the job.

7. A data processing system, comprising:
    a processor;
    a network interface configured to couple the data processing system to a cluster of data processing systems;
    data storage coupled to the processor, wherein the data storage includes driver program code that, when executed by the processor, causes the data processing system to perform:
        requesting, from a cluster manager, (1) execution of a first task within a job including a plurality of tasks and (2) a first quantity of resources of the cluster to support execution of the task; and
        at completion of execution of the first task by the cluster, retaining for a second task among the plurality of tasks at least a portion of the resources allocated to the first task by the cluster manager, wherein the retaining includes:
            determining a second quantity of the resources to retain for the second task based on a relative priority of the job to other jobs in the cluster and efficiency of the cluster manager in allocating resources to the first task.

8. The data processing system of claim 7, wherein the retaining includes determining to retain the at least a portion of the resources allocated to the first task by the cluster manager only in response to determining a resource allocation time is less than a resource reuse time.

9. The data processing system of claim 7, wherein the requesting includes determining the first quantity of resources based on a resource allocation time and a task execution time.

10. The data processing system of claim 9, wherein the first quantity of resources is further based on a third quantity of resources retained following execution of a third task among the plurality of tasks that precedes the first task.

11. The data processing system of claim 9, wherein the resource allocation time is a weighted resource allocation time derived across multiple tasks.

12. The data processing system of claim 7, wherein the driver program code, when executed by the processor, further causes the data processing system to perform:
    requesting, from the cluster manager, execution of the second task within the job.

13. A computer program product, the computer program product comprising a computer readable storage medium having program instructions embodied therewith, the program instructions executable by a data processing system, to cause the data processing system to perform:
    requesting, from a cluster manager, (1) execution of a first task within a job including a plurality of tasks and (2) a first quantity of resources of the cluster to support execution of the task; and
    at completion of execution of the first task by the cluster, retaining for a second task among the plurality of tasks at least a portion of the resources allocated to the first task by the cluster manager, wherein the retaining includes:
        determining a second quantity of the resources to retain for the second task based on a relative priority of the job to other jobs in the cluster and efficiency of the cluster manager in allocating resources to the first task.

14. The computer program product of claim 13, wherein the retaining includes determining to retain the at least a portion of the resources allocated to the first task by the cluster manager only in response to determining a resource allocation time is less than a resource reuse time.

15. The computer program product of claim 13, wherein the requesting includes determining the first quantity of resources based on a resource allocation time and a task execution time.

16. The computer program product of claim 15, wherein the first quantity of resources is further based on a third quantity of resources retained following execution of a third task among the plurality of tasks that precedes the first task.

17. The computer program product of claim 15, wherein the resource allocation time is a weighted resource allocation time derived across multiple tasks.

18. The computer program product of claim 13, wherein the program instructions, when executed by the data processing system, further cause the data processing system to perform:
    requesting, from the cluster manager, execution of the second task within the job.

* * * * *